(12) United States Patent
Villani et al.

(10) Patent No.: US 8,555,407 B2
(45) Date of Patent: Oct. 8, 2013

(54) ON DEMAND VISIBILITY SERVICES AND SMART DIRECTORY

(75) Inventors: Kathy Villani, Gainesville, VA (US); Michael E. Gentry, Amissville, VA (US); Kathryn Miller, O'Fallon, MO (US); Christopher Pate, O'Fallon, IL (US); James E. Bromhal, Manassas, VA (US); Justin C. Kerber, Granite City, IL (US); John M. Hatcher, Santa Maria, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 905 days.

(21) Appl. No.: 12/588,293

(22) Filed: Oct. 9, 2009

(65) Prior Publication Data

US 2011/0088099 A1    Apr. 14, 2011

(51) Int. Cl.
*H04L 29/06*      (2006.01)
(52) U.S. Cl.
USPC ........................................... 726/27
(58) Field of Classification Search
None
See application file for complete search history.

(56) References Cited

U.S. PATENT DOCUMENTS

| | | | |
|---|---|---|---|
| 7,181,407 B1* | 2/2007 | Kanevsky et al. | 705/319 |
| 2003/0065774 A1* | 4/2003 | Steiner et al. | 709/225 |
| 2003/0135628 A1* | 7/2003 | Fletcher et al. | 709/229 |
| 2006/0059564 A1* | 3/2006 | Tan et al. | 726/27 |
| 2006/0190358 A1* | 8/2006 | Slik | 705/27 |

* cited by examiner

*Primary Examiner* — Gilberto Barron, Jr.
*Assistant Examiner* — Malcolm Cribbs
(74) *Attorney, Agent, or Firm* — Oblon, Spivak, McClelland, Maier & Neustadt, L.L.P.

(57) ABSTRACT

An on-demand communication system, device, method and program are provided which allows a consumer to request information from an on-demand visibility service. The on-demand visibility service places a request with the on-demand directory service that may then choose a relevant provider to be queried for this information based on situation-based access control logic. The on-demand visibility service then queries the relevant providers with the request for information. Providers may then gather information by optionally using sensors, and may then transmit a provider response to the on-demand visibility service. The on-demand visibility service may then forward this provider response in the form of an answer to the consumer, thereby satisfying the consumer request for information.

24 Claims, 9 Drawing Sheets

| PROVIDER ID | ACCESS RULE | LOCATION | ACCOUNT | SENSORS |
|---|---|---|---|---|
| 1 | ONLY ACCESSIBLE 9AM-5PM, MONDAY-FRIDAY | CORNER OF KING ST. AND WASHINGTON ST., ALEXANDRIA, VA | 100 POINTS | CAMERA, GPS SENSOR |
| 2 | ONLY ACCESSIBLE BY MANAGERS OF BUSINESS | 1600 PENNSYLVANIA AVE., WASHINGTON, DC | 150 POINTS | CAMERA, GPS SENSOR, TEMPERATURE SENSOR, HUMIDITY SENSOR |
| 3 | ONLY ACCESSIBLE DURING A NATIONAL EMERGENCY | CORNER OF ADDISON ST. AND WAVELAND AVE., CHICAGO, IL | 100 POINTS | CAMERA, GPS SENSOR, OPTICAL SENSORS |
| 4 | ALWAYS ACCESSIBLE | CORNER OF 9TH ST. AND PASSYUNK AVE., PHILADELPHIA, PA | 200 POINTS | NO SENSORS |
| ... | ... | | ... | ... |
| n | | | | |
| SWARM A | ACCESSIBLE FOR PROVIDERS 1 AND 3, BUT NOT PROVIDERS 2 AND 4 | VARIOUS LOCATIONS | 1000 POINTS | CAMERA, GPS SENSOR, TEMPERATURE SENSOR, HUMIDITY SENSOR, OPTICAL SENSOR, VIBRATION SENSOR, AUDIO SENSOR |

FIG. 4

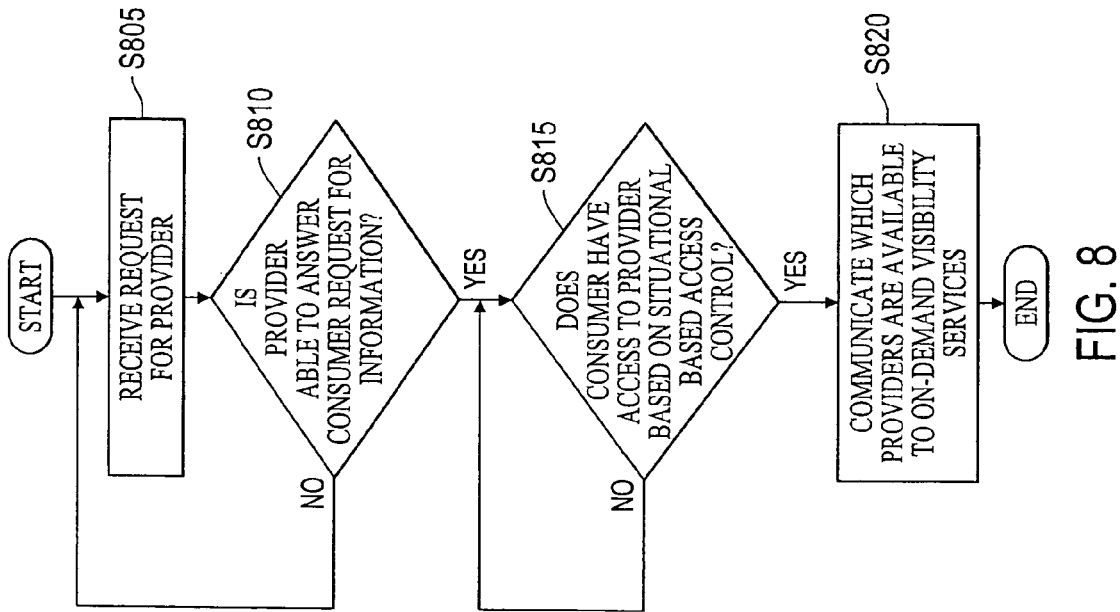

ON DEMAND VISIBILITY SERVICES AND SMART DIRECTORY

BACKGROUND

The present disclosure describes an on-demand data gathering system and method that enables a consumer (user or information technology system) to request information from a pool of one or more appropriate providers, and enables the provider(s) to answer the request for information by sending the information to the consumer via the on-demand visibility service.

Conventional information technology (IT) systems have information "blind spots" due to outdated, inaccurate or imprecise data. These systems employ encapsulated, rigid processes to maintain system information. Most of these systems treat people as user/consumers of the system rather than participant providers that can be leveraged in an ad hoc, on-demand fashion as resources of information. While Business Process Management workflows can send tasks for people to perform, these tasks are pre-defined, structured and rigid. Instant messaging allows users to communicate in ad hoc interactions, but access to users of the instant messaging service is not filtered based on situational attributes.

Wireless communication devices have increased in recent popularity and easily connect people to facilitate social conversation or information sharing. However, despite recent advances in wireless communication devices, conventional IT systems do not leverage humans and sensors as dynamic, mobile information contributors.

SUMMARY

The present disclosure leverages users, wireless communication devices and sensors as providers of information in a network configuration to eliminate information blind spots and allow for on-demand access to information. The on-demand communication system may include a consumer device that is configured to generate a request for information, a provider device that is configured to generate a provider response that is responsive to the request for information, an on-demand directory service that is configured to store provider information and access control policy, and an on-demand visibility service that is a broker between the consumer device and provider device. The on-demand visibility service receives requests for information from the consumer, requests a list of appropriate providers from the on-demand directory service based, transmits a provider query to a select provider, receives the provider response responsive to the provider query, and transmits an answer to the request for information to the consumer.

Human users of the on-demand system can be both consumers and providers of the system. They can request information from information providers via the on-demand visibility service, while also providing such information to the on-demand visibility service when queried to do so. Accordingly, users of the on-demand system may be utilized to provide accurate information and help eliminate information loopholes.

BRIEF DESCRIPTION OF THE DRAWINGS

Exemplary embodiments are described in detail below with reference to the accompanying drawings wherein like numerals reference like elements, and wherein:

FIG. 4 is an exemplary table providing one configuration of situation-based access control;

FIG. 8 is a flowchart illustrating exemplary on-demand directory service logic.

DETAILED DESCRIPTION OF EMBODIMENTS

Figure 1:
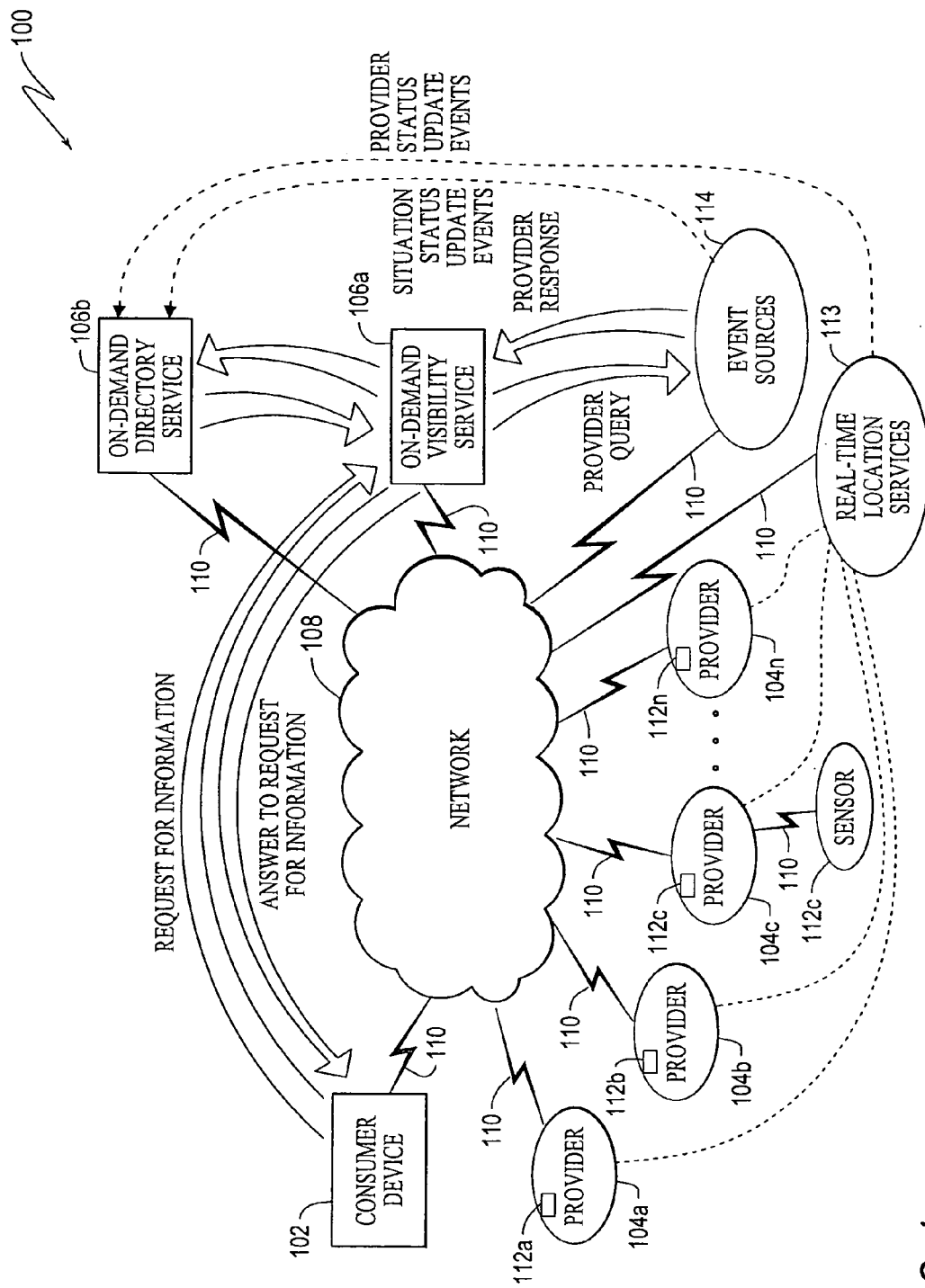
FIG. 1 is a block diagram of an exemplary device of the on-demand communication system.

FIG. 1 is an exemplary block diagram of an on-demand communication system 100 according to the present disclosure. The on-demand communication system 100 can include a consumer 102, providers 104a-104n, an on-demand visibility service 106a, an on-demand directory service 106b, real-time location services 113 and event sources 114. As shown, each device 102, 104, 106, 113 and 114 can be in communication with each other over a network 108, and can be coupled with the network 108 via communication links 110.

The consumer 102 can be a device of any type that allows for the transmission and/or reception of data. The data can include requests for information that the consumer 102 can transmit to the on-demand visibility service 106a, as well as an answer to the request for information that the on-demand visibility service 106a can transmit to the consumer 102. By way of example, the consumer 102 can be any device, such as voice and video telephone sets, streaming audio and video media players, integrated intelligent digital television receivers, DBS receivers, personal computers, work stations, radios, personal digital assistants, PCS/cellular wireless voice and Internet phones, mobile satellite receivers, GPS receivers, software systems, social networks or any combinations of these.

The providers 104a-n can also be a device of any type that allows for the transmission and/or reception of data. Such data can include receiving a provider query that can be transmitted from the on-demand visibility service 106a, as well as transmitting a provider response that can be generated by the provider 104a-n and transmitted to the on-demand visibility service 106a. As discussed in greater detail below, the provider response can include provider information that is responsive to the provider query.

The providers 104a-n can also include one or more sensors 112a-n for acquiring information. The sensors 112a-n may be any device for collecting information, and can include a camera, video camera, key pad, temperature sensor, humidity sensor, global positioning system (GPS) sensor, audio sensor, vibration sensor, electrical sensor or combinations thereof, and/or any other sensor that may aid in data gathering. The sensors 112a-n may be integral with, or otherwise operatively coupled to the providers 104a-n so that information obtained by the sensors 112a-n may be transmitted to the on-demand visibility service 106a via the network 108. As shown, a sensor 112a-n may be remotely located from the provider, such as sensor 112c, and coupled to the provider 104c via a communication link 110.

The on-demand visibility service 106a can be any device that transmits and receives data from the consumer 102 and the providers 104a-n. The on-demand visibility service 106a requests a list of provider addresses based on consumer attributes and situation attributes. The on-demand directory 106b can include logic to selectively permit the consumer 102 to access various providers 104a-n based on rules or policies that can generally be referred to as situational based access control. The logic that represents the situational based access control can be stored in a memory of the on-demand directory 106b, and may be updated as necessary by authorized users.

As shown, the on-demand visibility service 106a can receive requests for information from the consumer 102 via the network 108. Using the logic of the situational based access control, the on-demand directory 106b can determine which providers are appropriate to handle a request for information. For example, the on-demand directory service 106b can determine which of the providers 104a-n are available to respond to the consumer's request for information. The availability of a provider 104a-n can depend on numerous factors, such as location, available sensors, prior agreement between provider and on-demand directory service 106b, time of day, date, and the like. Availability can also be contingent on a state of a predetermined condition, such as a threat level, so that a particular provider may only be queried when the threat level exceeds a predetermined threshold. If the request for information can be satisfied by one or more available providers 104a-n, then the request for information may be converted into a provider query that is transmitted to the one or more providers 104a-n.

The one or more providers 104a-n that are selected by the on-demand directory 106b in accordance with the logic of situational based access control can each receive the provider query for information formulated and transmitted by the on-demand visibility service 106a. In response to the provider query, each provider 104a-n can collect data to generate a response. The collected data may be from the sensor 112a-n alone, or may require interaction with a user of the provider device 104a-n. The provider query for information may only require the user of the provider device 104a-n to respond to the provider query based only on a user's observation, and without reliance on the sensors 112a-n. Once the provider 104a-n generates a response to the provider query, each participating provider 104a-n can transmit a provider response to the on-demand visibility service 106a. The provider response can include provider information that is responsive to the provider query.

Subsequently, the on-demand visibility service 106a can receive the provider response, including any provider information, from one or more of the providers 104a-n. The on-demand visibility service 106a may further process the provider response and package the provider information into an answer to the consumer's request for information. Subsequently, the on-demand visibility service 106a can transmit the answer to the request for information to the consumer device 102 via the network 108.

While the on-demand visibility service 106a is shown as an independent unit coupled to the network 108, it can also be incorporated into the consumer 102, providers 104a-n and/or may be distributed throughout the network 108. For example, the on-demand visibility service 106a may be made part of the various central offices or servers (not shown) employed by the network 108 which are distributed throughout the network 108. Any configuration that permits monitoring and control of the on-demand communication system 100 can be used without departing from the spirit and scope of the present disclosure.

The network 108 may be a single network or a plurality of networks of the same or different types. For example, the network 108 may include a local telephone network in connection with a long distance telephone network. Further, the network 108 may be a data network or a telecommunications or video distribution (e.g., cable, terrestrial broadcast, or satellite) network in connection with a data network. Any combination of telecommunications, video/audio distribution and data networks, whether a global, national, regional, wide-area, local area, or in-home network, may be used without departing from the spirit and scope of the present disclosure. For the purposes of discussion, it will be assumed that the network 108 is a single integrated voice, video and data network that is either wired and/or wireless.

The communication links 110 may be any type of connection, wired or wireless, that allows for the transmission of information. Some examples include conventional telephone lines, digital transmission facilities, fiber optic lines, direct serial/parallel connections, cellular telephone connections, satellite communication links, local area networks (LANs), Intranets and the like.

The real-time location services 113 can include monitoring equipment to determine the location of various providers 104a-n at any given time, for example, based on the GPS coordinates of the provider 104a-n. The real-time location services 113 can communicate with the on-demand directory service 106b to update the status of various providers 104a-n based on the location determined by the real-time location services 113. While the term "real-time" is used to describe the location services, it should be appreciated that a location of the provider(s) 104a-n can be determined at any time after a request for information has been transmitted by the consumer 102, including instantaneously or at a time delay.

The event sources 114 can be any device, system, computer-readable storage medium or software-based applications that are capable of changing the status of relevant providers 104a-n of the on-demand directory service 106b. For example, if the U.S. Department of Homeland Security (DHS) were to change the terror threat from "orange" to "red," high-ranking officials within the DHS would be less available during this time. Also, following a traffic accident, the on-demand directory service 106b could limit requests for information that are transmitted to rescue officials located near the accident so that such officials may concentrate on their task at hand. Weather events, financial news, or any other event(s) could also be analyzed to determine and update the availability of relevant providers 104a-n. In this manner, external events may update attributes or the status of potential providers 104a-n in the on-demand directory service 106b.

During operation of the on-demand communication system 100, the consumer 102 may request information from the on-demand visibility service 106a through the network 108. The request for information can be automatically generated by the consumer device 102 and/or created by a user of the consumer device 102. For example, the user may request information by a phone call, a text message, a typed request, facsimile message, and/or e-mail message to the on-demand visibility service 106a via the network 108. Or, a consumer software system may request information via a web service call to the on-demand visibility service 106a.

In one example, a consumer 102 may wish to know the traffic conditions at a particular intersection of streets to assist the consumer 102 in making travel plans. Thus, the user of the consumer device 102 can generate a request for such information and transmit the request to the on-demand visibility service 106a. The request can include the identification of the consumer 102 and the type of information that is being requested, such as the identification of the intersection for which the traffic information is being requested. The request can also identify the type of information that the consumer wants, such as a photograph of the intersection and/or a text message describing the traffic at the respective intersection. The request can also include an indicator of how urgent the information is, for example, whether the user of the consumer 102 needs the information immediately, or if the information can be provided in the next hour or so. The request for information regarding traffic at this specific intersection can then be transmitted to the on-demand visibility service 106a.

After the request for information is received, the on-demand visibility service 106a may generate a request to the on-demand directory service 106b for a list of selected providers 104a-n based on situational based access control policy. Using the traffic intersection example, the on-demand directory 106b may determine which providers 104a-n are located near or at the intersection using, for example, GPS technology provided by the real-time location services 113. The on-demand directory 106b may further determine which of the providers 104a-n, despite being located at the intersection, are not available to the specific consumer 102 based on the situation based access control policy. For example, the on-demand directory 106b may refuse to grant access to a provider that has previously opted out of responding to traffic related requests, despite that the particular provider is located at the specified intersection. Therefore, the on-demand directory 106b may select available providers 104a-n, which may generate an accurate provider response, while simultaneously refusing to grant access to any providers who should not be contacted per a prior agreement.

After a provider 104a-n is selected by the on-demand directory service 106b and returned to the on-demand visibility service 106a, the selected provider(s) 104a-n can be queried for information by the on-demand visibility service 106a. In response to the provider query, the selected provider(s) 104a-n can use the sensors 112a-n to generate a response. Alternatively, or in addition, the user of the provider(s) 104a-n may generate and transmit a text or audio message to the on-demand visibility service 106a in response to the specific provider query. For example, in the traffic scenario described above, the on-demand visibility service 106a may generate a provider query asking a selected provider 104a-n for traffic information at a specific intersection. The provider 104a-n could then collect the traffic information by, for example, taking a photograph of the intersection or by visually observing the intersection. After gathering the traffic information, the provider 104a-n may then generate a provider response by sending a photograph of the intersection and/or a written text description of the traffic conditions at the intersection to the on-demand visibility service 106a.

Once the provider response is received, the on-demand visibility service 106a may store the newly received information in a database, and subsequently transmit the information to the consumer 102, as an answer to the request for information. By storing the information in a database, the on-demand visibility service 106a may subsequently transmit the same information to a different consumer 102, if the on-demand visibility service 106a is queried for similar information in the future. Thus, efficiency can be achieved because the providers 104a-n need not be re-queried for the information previously collected by the on-demand visibility service 106a.

The on-demand visibility service 106a may further employ a filtering system to ensure that only relevant information is transmitted to the consumer 102. A filtering system can reduce errors or mistakes on the part of the providers 104a-n that fail to adequately answer the consumer's request for information. For example, a consumer 102 may request that a photograph be taken of a street intersection, and a selected provider 104 may generate a photograph of the wrong intersection. In that example, the filtering system would not permit the incorrect intersection photograph to be forwarded to the consumer 102.

The filtering system may be embodied within the on-demand visibility service 106a and may selectively permit the transmission of provider responses to relevant consumers 102. The filtering system may include hardware or software stored on a memory and may analyze the provider response for information based on various consumer-related factors. For example, using the traffic intersection example above, the filtering system of the on-demand visibility service 106a may analyze the provider response and determine that the photograph was taken of a different intersection than that requested by the consumer 102 based on the GPS coordinates of the provider 104 at a time when the photograph was taken.

The filtering system may receive provider responses from several providers 104a-n and perform statistical analysis on each of the providers to determine if one or more provider responses are inaccurate. For example, if a consumer 102a-n sends a consumer request for information, asking for the temperature of a warehouse, the providers 104a-n can be queried for such information by the on-demand visibility service 106a and the respective provider responses may be received and stored by the on-demand visibility service 106a. The provider responses can then be analyzed by the filtering system to determine if one of the provider responses provides a temperature that is significantly different from the other provider responses. For example, assume nine providers 104a-n generate provider responses, and each of the provider responses informs the on-demand visibility services 106a that a temperature of the warehouse is 70° F.±2° F. Further assume that a tenth provider 104a-n generates a provider response informing the on-demand visibility service 106a that the temperature is 90° F. In such a situation, the filtering system can determine that the tenth provider response is erroneous, and the filtering system may perform statistical analysis to determine that the provider response has generated a value outside of a predetermined tolerance. The on-demand visibility service 106a may thus omit inaccurate responses when sending provider responses to the consumer 102, thereby increasing the accuracy of the information.

While the above example included situation based access control relating to the provider 104a-n status and location, it should be understood that the situation based access control is not limited to this embodiment. The situational based access control can determine the availability of various providers 104a-n based on any criteria. For example, the situation based access control may include the status of the provider (e.g., the president of the United States versus a university student), a relationship between the consumer 102 and the provider 104 (e.g., the consumer 102 is a business colleague of the provider 104), a national security measurement (e.g., the terror threat is "orange," and thus members of the Department of Homeland Security will only be queried for information related to the security of the nation during this time), a status of the consumer 102 (e.g., has the consumer 102 paid the necessary amount of money to query a specific provider 104), a location of the provider 104, various sensors utilized by the provider 104, whether the consumer information request was generated during a weekend or holiday, and the like. If the on-demand directory service 106b determines that the consumer 102 is not authorized to query various providers 104, based on the situation based access control, the on-demand visibility service 106a may generate a message notifying the consumer 102 that the consumer request for information will not be answered. Further, while any of the above factors, or combinations thereof, may be utilized when determining the access control policy, any other relevant factor may be utilized without departing from the spirit and scope of the present disclosure.

As a technique of encouraging participation in the on-demand communication system 100, users of the provider 104 devices may receive incentives to be listed in or become a member of the on-demand directory service 106b and to respond to provider queries from the on-demand visibility services 106a. For example, the user of a provider device 104a-n may receive compensation for each provider response, or may receive a discount on their phone or wireless service based on the amount of information conveyed by the user of the provider device 104a-n in a given month. The user may also receive "points" each time a provider response is generated by the provider device 104a-n, and may use these points to "purchase" accessories to the provider device 104a-n or additional services not currently paid for by the user. An example of such a service would be the on-demand communication service itself. For example, the user may be authorized to ask one question (as a consumer 102) for every answer previously generated (as a provider 104). Of course, any incentive technique may be utilized in order to motivate providers 104a-n to generate answers to queries from the on-demand visibility service 106a without departing from the spirit and scope of the present disclosure.

In particular applications, it can be preferable that a human-user of the provider 104a-n authorizes the provider response prior to transmitting the response to the on-demand visibility service 106a. However, the provider 104 may automatically respond to a provider query for information by transmitting information from the sensor 112a-n. For example, no human authorization would be required to transmit information relating to the temperature at a specific location and time if a temperature sensor were embodied within the provider 104 device. Rather, the provider 104 may automatically respond with the measured temperature when queried by the on-demand visibility service 106a.

Figure 2A:
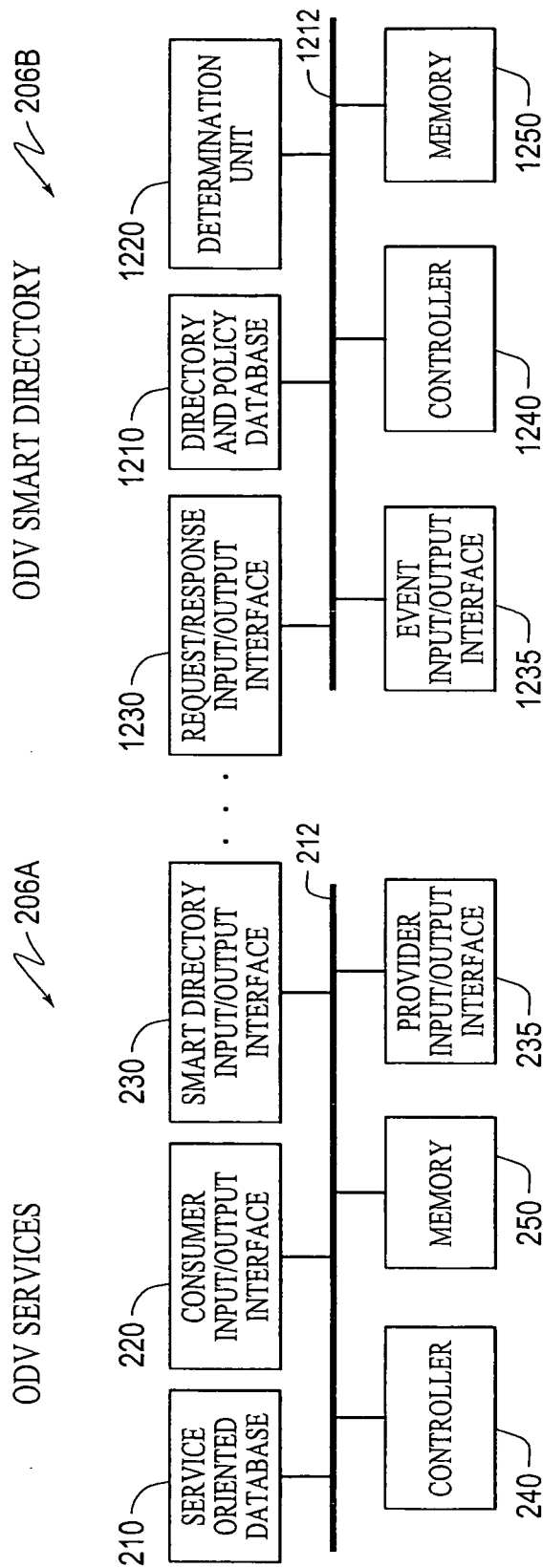
FIG. 2a and FIG. 2b are block diagrams of an exemplary device of the on-demand visibility service and on-demand smart directory service.

FIG. 2a is an exemplary block diagram of on-demand visibility services 206a and on-demand visibility smart directory 206b. The on-demand visibility services 206a can include a service-oriented database 210, a consumer input/output interface 220, a smart directory input/output interface 230, a provider input/output interface 235, a controller 240 and a memory 250. As shown, the devices of the on-demand visibility services 206a can be coupled together through a control/signal bus 212.

The on-demand visibility smart directory 206b can include a directory and policy database 1210, a determination unit 1220, a request/response input/output interface 1230, an event input/output interface 1235, a controller 1240 and a memory 1250. Similar to the on-demand visibility services 206a, the devices of the on-demand visibility smart directory 206b can be coupled together through a control/signal bus 1212.

The service-oriented database 210 and memory 250 may be any device that stores data. The data stored in the service-oriented database 210 and memory 250 can include, for example, consumer requests, provider answers, business services, information services, software applications and operating systems for the on-demand visibility services 206a.

The consumer input/output interface 220, smart directory input/output interface 230, and the provider input/output interface 235 may each be any device that transmits and/or receives data and that is capable of inputting or outputting data of the on-demand visibility services 206a via the network 108. For example, in addition to communication with the network 108, the consumer input/output interface consumer 220 can receive a request for information from the consumer device 102 either directly from the consumer 102 or indirectly via the network 108, and provide answers to requests for information to the consumer devices 102 when such answers are available. Further, the smart directory input/output interface 230 can communicate requests for information to the on-demand visibility smart directory 206b to be analyzed for determination of relevant providers 104a-n, and can receive information relating to the relevant providers from the on-demand visibility smart directory 206b. The provider input/output interface 235 can then transmit provider queries, and receive provider responses, from various providers 104a-n.

The controller 240 can be, for example, a computer processor embodied within a personal computer, or any other device that allows for the control of transmission and reception of data via a network. In the embodiment shown in FIG. 2a, the service-oriented database 210, the various input/output interfaces 220, 230, 235 and memory 250, all operate under the control of the controller 240.

The directory and policy database 1210 can be any device that stores data. The data stored in the directory and policy database 1210 can include, for example, situational based access control, results from complex event processing, and on-demand policy specifications.

The determination unit 1220 can be a device that determines which providers 104a-n are available to receive provider queries in response to a request for information from a consumer 102. As described above, in doing so, the determination unit 1220 can selectively determine whether the consumer device 102 has access to a specified provider device 104a-n. Further, the determination unit 1220 may determine the appropriate provider device 104a-n based on the situational based access control policy stored in the directory and policy database 1210. The determination unit 1220 may be coupled to the directory and policy database 1210 via the control/signal bus 1212 to utilize the situational based access control stored in the directory and policy database 1210.

The request/response input/output interface 1230 and event input/output interface 1235 may each be any device that transmits and/or receives data and that is capable of inputting or outputting data of the on-demand visibility smart directory 206b via the network 108. For example, in addition to communication with the network 108, the request/response input/output interface 1230 can communicate with the on-demand visibility services 206a via the smart directory input/output interface 230. The event input/output interface 1235 may be coupled to the directory and policy database 1210 via the control/signal bus 1212 to update the directory and policy database 1210 based on various events, such as weather events, traffic events, or events such as the Department of Homeland Security "terror threat," as discussed above with reference to FIG. 1.

The controller 1240 can be, for example, a computer processor embodied within a personal computer, or any other device that allows for the control of transmission and reception of data via a network. In the embodiment shown in FIG. 2b, the directory and policy database 1210, determination unit 1220, the various input/output interfaces 1230, 1235 and memory 1250, all operate under the control of the controller 1240. However, it should be appreciated that the devices of the on-demand visibility smart directory 206b can operate under the control of the controller 240 of the on-demand visibility services 206a, and vice versa.

The memory 1250 is any device that is capable of storing data. Data stored in the memory 1250 can include consumer requests, provider answers, business services, information services, situational based access control, software applications and operating systems for the on-demand visibility smart directory 206b.

Figure 2B:
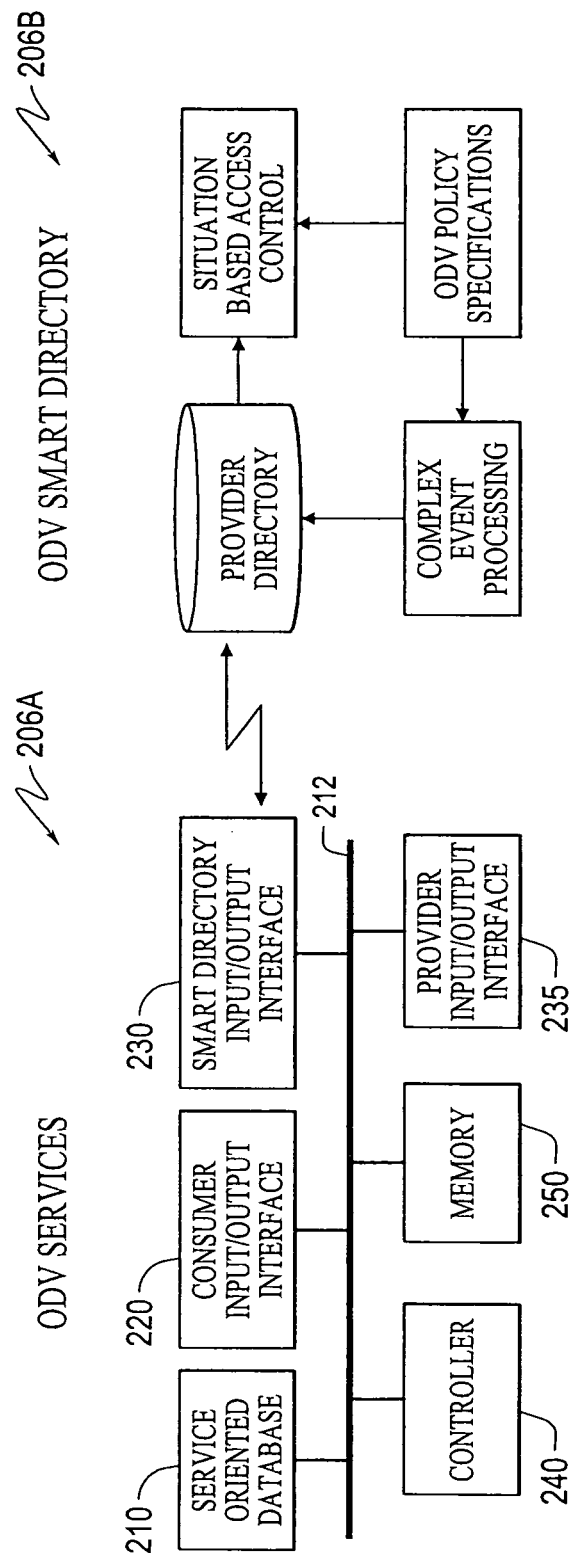

FIG. 2b is another exemplary block diagram of the on-demand visibility services 206a and on-demand visibility smart directory 206b. FIG. 2b illustrates one manner of processing data within the on-demand visibility smart directory 206b to selectively determine appropriate provider(s) 104a-n that will receive request(s) for information. As shown, the devices of the on-demand visibility smart directory 206b can be the same as those discussed above with regard to FIG. 2a. The on-demand smart directory 206b is illustrated functionally, describing the various interactions between the devices shown in FIG. 2a.

During operation of the on-demand smart directory 206b and on-demand visibility services 206a, the consumer 102 may transmit a consumer request for information to the on-demand directory services 206a. The consumer request for information can be received by the service-oriented input/output interface for use with the consumer 220 and sent to the controller 240. In response to the request for information, the controller 240 can use the situational access control policy stored in the service oriented database 210 of the on-demand smart directory 206b to select an available provider 104a-n. The controller 240 can then transmit a provider query to the selected provider(s) 104a-n. Using the traffic intersection example above, similar to the embodiment of FIG. 1, the controller 240, 1240 may query the determination unit 1220 to determine which providers 104a-n are available and located at or near the traffic intersection. Further, under the control of controller 240, 1240 the determination unit 1220 can access the situational based access control policy stored in the service oriented database 210 in order to determine which providers 104a-n are available to the consumer 102.

For example, provider 104a may be located at the specified intersection, but may be a high-ranking executive of a company. In this case, the determination unit 1220 may refuse to query the provider 104a for information based on the provider's status. In other words, the determination unit 1220 may determine which providers 104a-n are able to suitably provide accurate information, and may eliminate providers 104a-n that the consumer 102 is not permitted to access, based on the situational based access control policy stored in the directory and policy database 1210. Thereafter, the controller 240, 1240 can instruct the determination unit 1220 to transmit available provider information to the controller 240, 1240 regarding which providers 104a-n will receive a provider query.

The controller 240 may then communicate with the selected providers 104a-n by transmitting a provider query through the input/output interface for use with the provider 235. After receiving the provider query, the provider 104a-n (or user thereof) may gather information by, for example, human observation and/or by using one of various sensors 112a-n, and may then transmit a provider response to the on-demand directory services 206a answering the consumer request for information.

After the provider response is received via the provider input/output interface 235 of the on-demand directory services 206a, the controller 240 can store the provider response in the memory 250. The controller 240, 1240 may further cause the determination unit 1220 to determine the consumer 102 that generated the consumer request for information that has now been answered by the provider response. The controller 240, 1240 may then cause the provider response to be adequately packaged and prepare the consumer input/output interface 220 to transmit the provider response to the relevant consumer 102 by, for example, obtaining the telephone number or email address of the consumer 102 from the memory 250.

Similar to the embodiment of FIG. 1, the controller 1240 may cause the memory 1250 to execute filtering software that performs a statistical analysis on the provider responses to determine if the provider response is inaccurate. The filtering software may also determine if the provider response was sent from a specific location based on GPS coordinates or if the provider 104a-n sent the provider response within a designated time period. If the filtering software determines that the provider response is accurate, the provider response may be packaged in an appropriate format, and the controller 1240, 240 may then cause the provider response to be output via the consumer input/output interface 220 to the relevant consumer 102, thereby satisfying the consumer request for information.

If a response is not generated by a provider 104a-n within a predetermined time period, the controller may cause the consumer input/output interface 220 to output a message to the consumer 102 that generated the consumer request. The message may indicate that no provider 104a-n has submitted a response to the consumer request or that the on-demand directory services 206a are otherwise unable to generate a response to the consumer request for information at that time.

Figure 3:
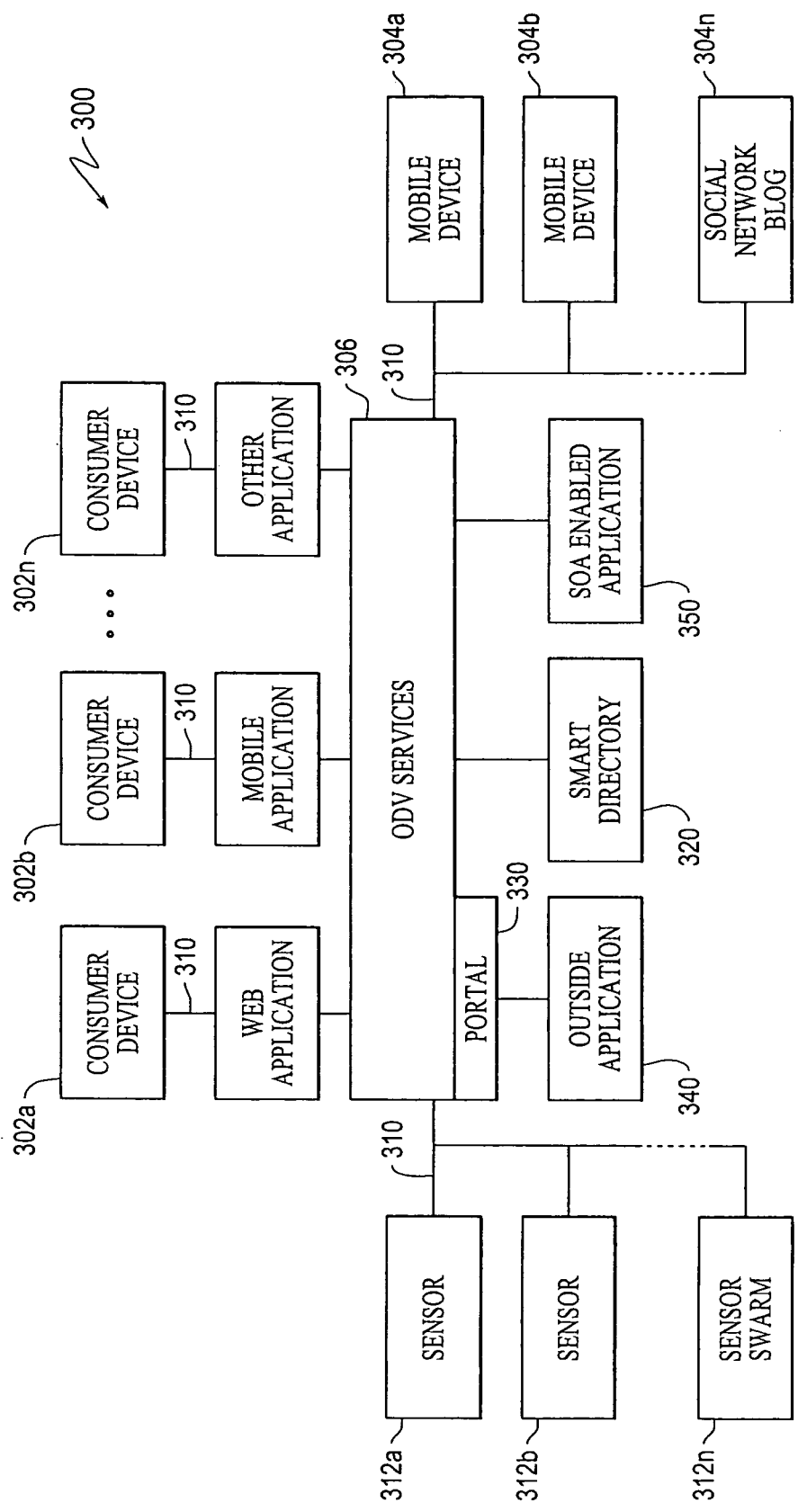
FIG. 3 is a block diagram of another exemplary device of the on-demand communication system.

FIG. 3 is another exemplary embodiment of the on-demand communication system 300 in accordance with the present disclosure. The on-demand communication system 300 can include consumers 302a-n operatively coupled to on-demand visibility services 306 via communication links 310. The on-demand visibility services 306 may be further coupled to providers 304a-n and also to sensors 312a-n via the communication links 310. The consumers 302a-n, providers 304a-n and communication links 310 include similar structure and functionality to those previously disclosed with regard to FIGS. 1 and 2.

As before, the on-demand visibility services 306 may be any device that transmits and receives data from the mobile consumer device 302a-n and the provider 304a-n. The on-demand visibility services 306 may include a smart directory 320 for storing services to be employed in a service-oriented architecture (SOA), such as business services, information services or enterprise service bus (ESB) services. The smart directory 320 may further store situational based access control policy to selectively permit the consumer 302a-n to access available providers 304a-n. The on-demand visibility services 306 may act as a manager of the services to various consumers.

A portal 330 may be provided in the on-demand visibility services 306 for adapting outside applications 340 to function within the software structure of the on-demand directory 306. Of course, SOA enabled applications 350 may also be embodied within the on-demand visibility services 306, and may be stored in the smart directory 320 or a separate data storage unit (not shown).

During operation, the consumer 302a-n may use the on-demand communication system 300 to determine, for example, the quantity of an item within a warehouse. A human user of the consumer 302a-n may transmit a consumer request to the on-demand visibility services 306, requesting information from the mobile provider device 304a-n via the on-demand directory 306. The consumer request may be a so-called blind request, where the consumer 302a-n does not request a specified provider 304a-n, or even care who the selected provider 304a-n will be. As shown, the consumer request may be transmitted via a web application, mobile application, or any other application that permits communication between the consumer 302a-n and the on-demand visibility services 306. The consumer request (blind or otherwise) may then be transmitted to the on-demand visibility services 306.

Once the consumer request is received, the on-demand communication system 300 may determine which providers 304a-n may be queried for information based on the situational based access control policy stored in the smart directory 320 or data storage unit (not shown) of the on-demand visibility services 306. For example, a provider 304a-n may be located in the warehouse specified by the user when querying the on-demand visibility services 306 for inventory information. However, certain providers 304a-n may not be queried for information based on their respective status (e.g., president of the company that owns the warehouse) or time of day (e.g., certain providers 304a-n may only allow themselves to be queried during normal business hours).

Once the relevant providers 304a-n are selected, the on-demand visibility services 306 may then transmit a provider inquiry to the provider 304a-n and/or the sensors 312a-n, to fulfill the request for information from the consumer 302a-n. The provider 304a-n may then gather information to answer the request for information, for example, the inventory information at a warehouse. While the provider 304a-n may gather information by using the sensors 312a-n, the provider 304a-n may alternatively, or additionally, gather information by simple human observation.

Once the provider 304a-n gathers the information requested by the provider inquiry, the provider 304a-n may then transmit information answering the provider inquiry, which may be referred to as a provider response, to the on-demand visibility services 306. For example, a provider 304a-n may transmit a picture of the item(s) stored in the warehouse and any accompanying text description (e.g., "four toilets, one damaged") to the on-demand visibility services 306. The on-demand visibility services 306 may then store the provider response in the smart directory 320 for future consumers 302a-n to access without the need to query a provider 304a-n. Alternatively, or additionally, the on-demand visibility services 306 may simply output the provider response to the consumer 302a-n, thereby satisfying the consumer request for information.

As shown in FIG. 3, the sensor 312a-n to which information is requested may combine with other sensors 312a-n to form a so-called sensor swarm, which may provide for increased reliability and accuracy of information. Various sensors 312a-n may communicate with one another via the sensor swarm to determine whether information from one sensor 312a-n corresponds, within reasonable bounds of error, to information from a second sensor 312a-n. For example, one sensor 312a-n may provide information regarding the inventory from goods transported via a freight train, whereas a second sensor 312a-n may provide information regarding the inventory of goods in a warehouse. In this example, a user of the on-demand visibility communication system 300 may utilize these various sensors 312a-n, together with inventory records from the warehouse, to determine where missing goods were potentially lost.

FIG. 4 shows an exemplary data structure 400 that can be used with the on-demand directory 106b service oriented database 210 and/or memory 250, described above with reference to FIG. 2. The data structure 400 can include various fields 405-425 that can contain data corresponding to the individual providers 104a-n. As described below, the data and fields 405-425 of the data structure 400 can be used to determine which providers are available to receive a provider query from the on-demand visibility service 106a. As shown, the data structure can include a provider identification field 405, an access rule field 410, a location field 415, an account field 420, and a sensor field 425. It should be understood that the data structure 400 can include any number of fields necessary to implement the on-demand communication system, and that those shown in FIG. 4 are merely exemplary.

The provider ID field 405 can be used to identify the providers 104a-n that are potentially available to participate in the on-demand communication system. The providers 104a-n may be identified by any technique, such as a telephone number, device ID, user name, and the like. For ease of explanation, the providers 104a-n shown in field 504 have been identified with a simple number or name.

Field 410 contains the access rule(s) corresponding to each provider in field 405. The access rule(s) can be part of the situation based access control policy, and can define the availability of a provider 104a-n. For example, the access rule in field 410 corresponding to Provider 1 would be that Provider 1 is only accessible between 9:00 am and 5:00 pm on Mondays-Fridays. In contrast, the access rule corresponding to Provider 3 would be that the Provider 3 is only accessible during a national emergency. As described above, the access rules(s) can be customized for each provider 104a-n, so that each provider 104a-n can control when and what type of provider queries they may receive. Also, the access rules in field 410 can be modified at any time by authorized personal to alter an availability of a provider 104a-n. Access rules are evaluated during each request by the on-demand visibility service. Rule evaluation may also be triggered by changes in events fired by event sources 114. For example, an event message indicating a change in homeland security threat level may trigger evaluation of rules that are based on homeland security threat level.

Again, the access rule shown in field 410 can be part of the situational based access control policy, and that the field 410 can be include the limits on availability of participating providers 104a-n. As described above, the situational based access control policy can limit availability of a provider 104a-n, and therefore provide limits on who can participate in the on-demand communication system 100 at the various levels.

For example, assume that a particular on-demand communication system includes only providers and consumers that work for the same company. Further, assume that the company has three types of employees: upper-level managers, mid-level managers and staff. In this scenario, one example of an access rule could be that providers that are upper-level managers are only permitted to be accessed by mid-level managers, while mid-level managers are permitted to be accessed by both upper-level managers and staff. Additionally, the access rule for providers that are staff, could be designed to transmit provider queries to an appropriate department. For example, accounting questions would go to staff (providers) that work in the accounting department. Likewise, provider queries relating to marketing can be transmitted to staff (providers) that work in the marketing department of the company.

In the above scenario, a requirement for information from a staff member, acting as a consumer, can be transmitted in accordance with access rules to the mid-level manager, without being transmitted to the upper-level manager. Thus, consistent with the access rules designed by the company, the upper-level managers will not receive every staff-generated request for information. Of course, upon review of a staff request for information, should the mid-level managers decide that the upper-level managers should receive the request for information, the mid-level managers can transmit the request for information to the upper-level managers, consistent with the access rule.

The location field 415 can include a location corresponding to the provider 104a-n in field 405. The location can be stored in any format, such as GPS coordinates, a street address and the like. The information in the location field 415 can be gathered from the provider 104a-n, from the real-time location service 113 that monitors the location of the provider 104a-n, or may be received by the user of the provider device. As described, in certain scenarios, the data contained in the location field 415 can be used by the situational based access control policy, in conjunction with the access rule in field 410, to determine whether a provider is available to receive a provider query.

The account field 420 can include a point or currency system to monitor the activity of participating providers within the on-demand directory 106b. The "points" can be used to quantify the ability of various providers to use the on-demand visibility service 106a and may be purchased or obtained by generating provider responses. The points may then be used to "purchase" provider responses from other participating providers 104a-n of the on-demand directory 106b. The points stored in the account field 420 can represent both a quantity of queries or quality of queries that the individual providers 104a-n are permitted to generate as consumers 102a-n. The "expense" of an individual consumer request for information can be based on the situational based access control of the selected provider 104a-n, and may include the position of the provider 104a-n within the company or the reliability of the provider 104a-n. As shown in FIG. 4, Provider 1 has accumulated 100 points, and Provider 2 has accumulated 150 points. Therefore, Provider 2 may query the on-demand visibility service 106a more often, or may query more "expensive" providers 104a-n for information as compared to Provider 1.

The sensor field 425 can include the various sensors 112a-n available to a selected provider 104a-n. The available sensors 112a-n can be determined by information previously stored in the on-demand directory 106b or may be determined immediately prior to querying the relevant providers 104a-n. For example, the on-demand directory 106b may transmit a signal to Provider 1, inquiring whether Provider 1 includes a temperature sensor. Provider 1 may respond to the on-demand directory 106b, either automatically or manually, by indicating the available sensors 112a-n embodied within or available to the provider 104a-n. By monitoring the available sensors, the on-demand directory 106b can efficiently query only those providers 104a-n with the necessary sensors 112a-n to satisfy the consumer request for information.

Figure 5:
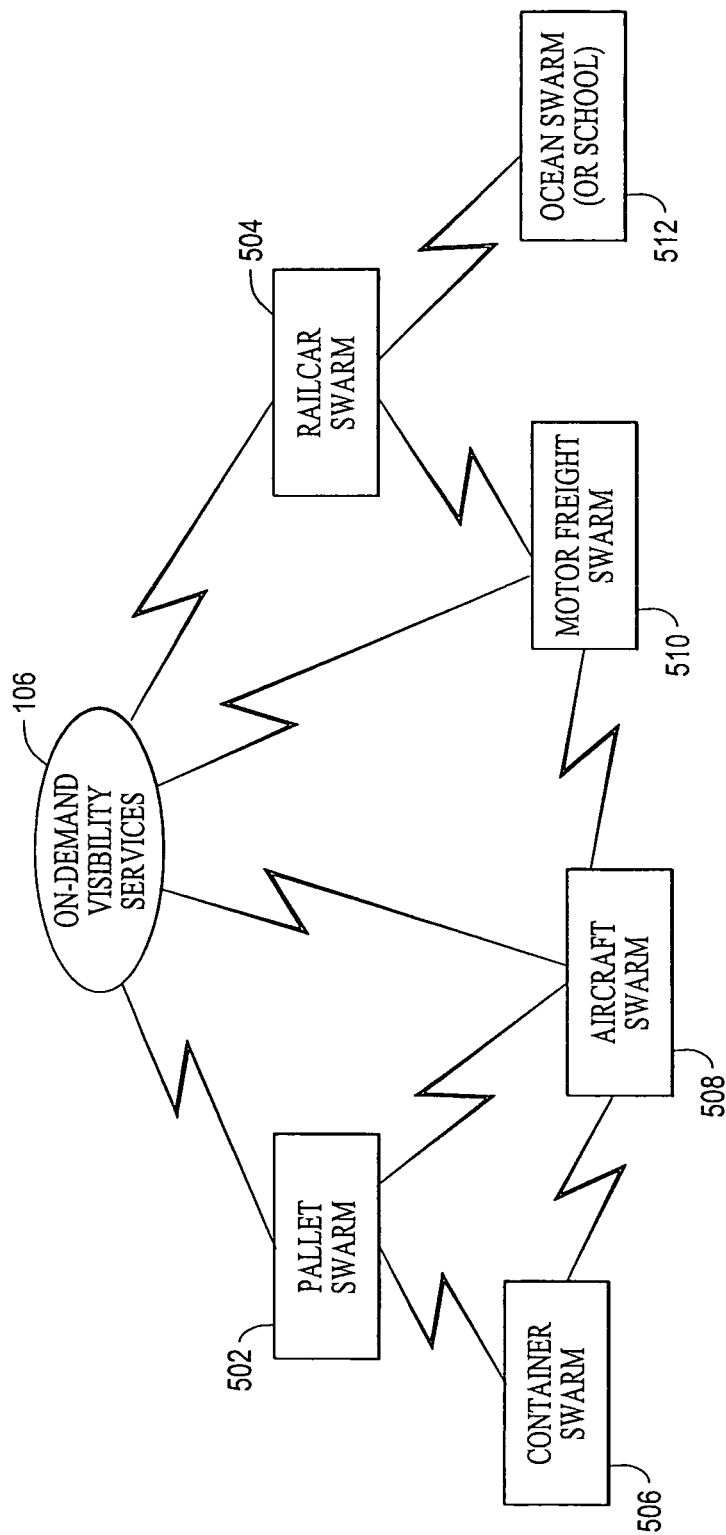
FIG. 5 is a block diagram illustrating several examples of sensor swarms.

FIG. 5 is a block diagram illustrating several examples of sensor swarms and their relation to the on-demand visibility service 106a. As discussed with reference to FIG. 3, a sensor swarm can be any group of sensors 112a-n that can communicate with one another or obtain a different perspective of a common situation. Exemplary sensor swarms can include a pallet swarm 502, a railcar swarm 504, a container swarm 506, an aircraft swarm 508, a motor freight swarm 510 and an ocean swarm 512. These swarms may include a plurality of sensors 112a-n that communicate with one another within the swarm, and the various swarms may communicate with one another. In this manner multiple sensors 112a-n may cooperate with one another to provide accurate information and satisfy consumer requests for information.

For example, a consumer 102a-n may request the temperature on a railcar where temperature-sensitive medication is stored. The on-demand visibility service 106a may transmit a provider query to the railcar swarm to determine the temperature in the railcar where the medication of interest is being stored. The various sensors 112a-n on the railcar may communicate with each other to determine an accurate temperature reading of the railcar based on statistical analysis of the various temperature readings. The railcar swarm 504 may then transmit the provider response to the on-demand visibility service 106a to ultimately be forwarded to the consumer 102a-n.

Alternatively, or in addition to the above exemplary application, the temperature sensors 112a-n on the railcar swarm can be utilized for purposes for which they were not originally intended. For example, after the medication is offloaded from the railcar, a consumer 102a-n may still require a temperature reading for inside the railcar to determine whether the temperature sensors 112a-n are functioning properly during routine maintenance. In this example, although the sensors 112a-n are not being used for their originally-intended purpose (i.e., to monitor the temperature for temperature-sensitive medication), the sensors 112a-n can still be used within the on-demand visibility service 106a to generate provider responses.

The various swarms may also be used to query a plurality of providers 104a-n so that the providers 104a-n may discuss the query with one another before responding to the provider query. For example, a central intelligence organization may query several providers 104a-n located in airplanes and observing a certain geographic region that was implicated in a possible homeland security emergency via an intelligence tip. The various providers 104a-n of the aircraft swarm 508 may discuss the situation with one another and determine the validity of the intelligence tip before responding to the provider query. Further, the provider query may be answered by a single provider 104a-n based on a previously determined "swarm leader" or based on the provider 104a-n requested by the provider query.

Further, as stated above, the swarms themselves may communicate with one another to, for example, track a piece of cargo from one location to another. Assume a package was sent by aircraft and a consumer 102a-n requested the exact location of the package at a given time. The consumer 102a-n may then transmit a consumer request to the on-demand visibility service 106a, which may then transmit a provider query to the aircraft swarm 508. If the package was no longer located on the aircraft, the aircraft swarm could communicate with the pallet swarm 502 which would indicate whether the package was still located on the pallet that was previously located on the aircraft. If the pallet swarm 502 is unable to locate the package, the pallet swarm 502 may communicate with the container swarm 506 to determine if the package was still located on the container that was previously located on the pallet. Such communication between the various swarms may reduce the occurrence of lost cargo by pinpointing the exact time when the cargo was identified as missing, and at which stage of transport (air travel, pallet processing or container processing) the package was lost.

Figure 6:
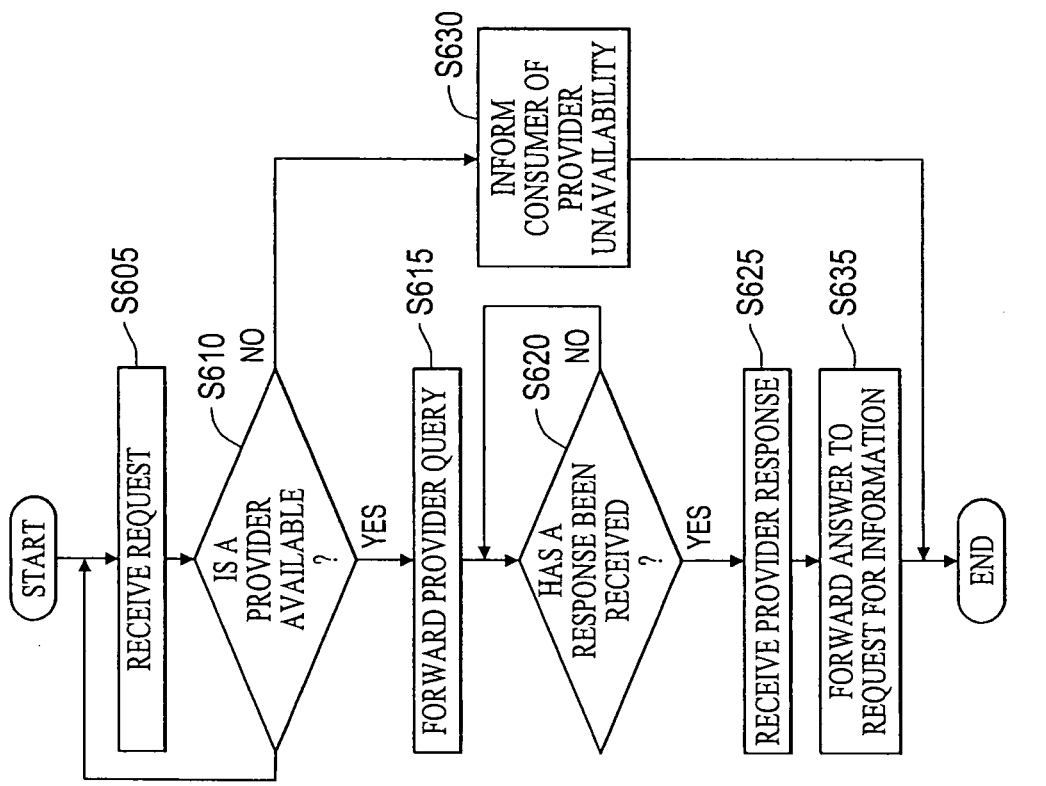
FIG. 6 is a flowchart illustrating exemplary on-demand visibility service logic.

FIG. 6 is an exemplary flowchart describing the operation of the on-demand visibility service 106a. The process begins and proceeds to step 605, where a request for information is received from a consumer device. The request can be received by the on-demand visibility service 106a. The process then proceeds to step 610.

In step 610, a request is sent to the on-demand directory service 106b to determine whether a provider is available to be queried in response to the request for information. As described above, the on-demand directory 106b may determine availability of a provider 104a-n based on situational access control policy. In step 610, if a provider is available, control proceeds to step 615; otherwise, control proceeds to step 630.

In step 630, because a provider is not available, the on-demand directory can inform the consumer making the request for information that an answer to their request for information cannot be provided. The process can then terminate.

In step 615, a provider query can be forwarded to any available provider. For example, a provider query corresponding to the request for information from the consumer device can be forwarded by the on-demand visibility service 106*a* to a provider 104*a-n* that the on-demand directory 106*b* has determined to be available. Again, the on-demand directory 106*b* can determine availability based on the situational based access control policy for the on-demand communication system 100. The process can then proceed to step 620.

In step 620, a determination is made as to whether there has been a response received from the provider. The process will remain at step 620 until a response has been received, and may eventually "time-out" if too much time has lapsed. However, when a response has been received from the provider, the process then proceeds to step 625. In step 625, a provider response is transmitted from the one or more available providers. For example, a provider response may be provided to the on-demand visibility service 106*a* in response to the provider query. The process then proceeds to step 635.

In step 635, based on the provider response, an answer to the request for information is transmitted back to the consumer device. For example, the on-demand visibility service 106*a* can receive the provider response from the provider 104*a-n*, and generate an answer to the request for information based on the provider response. The answer to the request for information can then be transmitted from the on-demand visibility service 106*a* to the consumer device 102 via the network 108. The process can then terminate.

Figure 7:
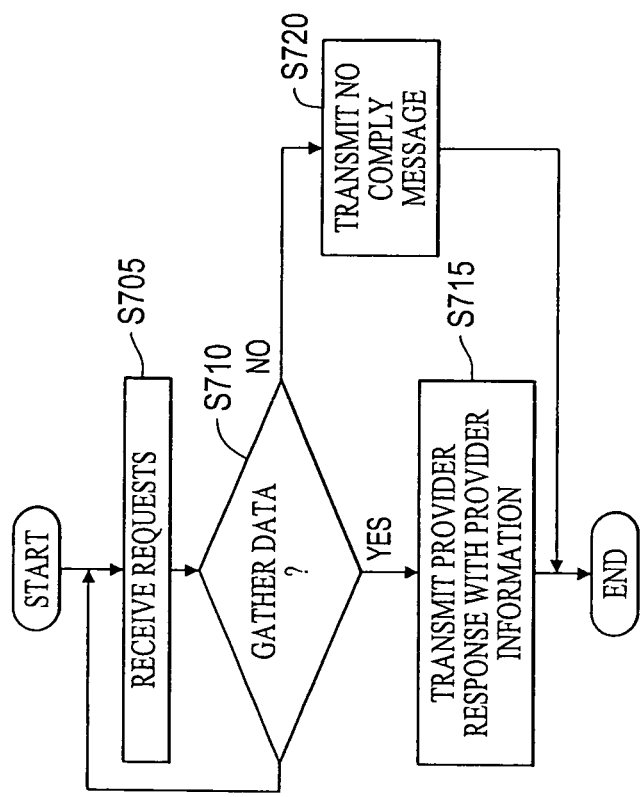
FIG. 7 is a flowchart illustrating exemplary provider logic.

FIG. 7 is a flowchart illustrating an exemplary provider 104*a-n* logic process within the on-demand communication system 100. The process begins and proceeds to step 705, where a provider 104*a-n* receives a provider query (or request) from the on-demand visibility service 106*a*. The process then proceeds to step 710.

It can then be determined whether the provider 104*a-n* includes the necessary capabilities (e.g., sensors 112*a-n*) to gather the data requested by the provider query. The process will remain at step 710 until a response has been received, and may eventually "time-out" if too much time has lapsed, in which case the process proceeds back to step 705 to query other providers 104*a-n*. If the provider 104*a-n* cannot possibly provide a provider response based on the capabilities of the provider 104*a-n*, or if the provider simply chooses not to provide a provider response, the process proceeds to step 720, where the provider 104*a-n* generates a no comply message and the process terminates. However, if the provider 104*a-n* can alternatively gather the appropriate data and package the data for a provider response, the process then proceeds to step 715.

In step 715, the provider response is transmitted together with the information requested by the provider query. The information gathered in step 710 may be appropriately packaged based on, for example, formatting considerations or capabilities of the consumer 102*a-n* that requested the information from the on-demand visibility service 106*a*. Once the provider response has been appropriately packaged, the provider 104*a-n* may then transmit the provider response to the on-demand visibility service 106*a*, which will then forward the response to the consumer 102*a-n* as discussed above with reference to FIG. 6. The process can then terminate.

FIG. 8 is a flowchart illustrating exemplary on-demand directory service logic. In general, the on-demand directory service logic can determine an appropriate list of providers 104*a-n* that are suitable to receive the consumer request for information. As discussed above, the list of providers 104*a-n* is dependent on the availability of the provider 104*a-n*, the ability for the provider 104*a-n* to answer the consumer request for information, and situational based access control logic relevant to the provider 104*a-n* and/or the consumer 102. The process begins and proceeds to step 805, where the on-demand directory service 106*b* receives a request to generate a list of appropriate providers 104*a-n* from, for example, the on-demand visibility service 106*a*. The process then proceeds to step 810.

In step 810, it is determined whether a particular provider 104*a-n* is able to suitably answer the consumer request for information. For example, in the traffic intersection example provided above, it can be determined in step 810 whether a particular provider 104*a-n* is located at the required traffic intersection. In yet another example, it can be determined whether the provider includes the necessary sensor(s) 112*a-n* to detect, for example, the temperature at a given location. If the provider 104*a-n* is not capable of answering the consumer request for information, the process repeats step 810 until a suitable provider 104*a-n* can be located. Once a suitable provider 104*a-n* is located, the process proceeds to step 815.

In step 815, it is determined whether the providers 104*a-n*, while suitable for answering the consumer request for information, are available to the particular consumer 102 based on situational based access control policy. For example, as discussed above, the situational based access control may designate a high-ranking government official as being unavailable to answer a consumer request for information related to routine traffic patterns. Also, a high-ranking corporate executive may be designated as unavailable at a given time period, e.g. during a pre-scheduled board of directors meeting. If a provider 104*a-n* is not available to the consumer 102 based on the situational based access control policy, the process repeats step 815 until a suitable provider 104*a-n* is located. Once a suitable provider 104*a-n* is located, the process proceeds to step 820.

In step 820, the suitable provider(s) 104*a-n* can be compiled into a list and transmitted to, for example, the on-demand visibility service 106*a*. Alternatively, or in addition to the above, individual names of provider(s) 104*a-n* may be transmitted to the on-demand visibility service 106*a* one-by-one. In this manner, the on-demand directory service logic can determine the exact provider(s) 104*a-n* that are capable of answering the consumer request for information without being unavailable to the consumer 102 based on situational based access control policy.

While the disclosed methods and systems have been described in conjunction with exemplary embodiments, these embodiments should be viewed as illustrative, not limiting. It should be understood that various modifications, substitutes, or the like are possible within the spirit and scope of the disclosed devices, methods and systems.

What is claimed is:

1. An on-demand communication system, comprising:
 a consumer device configured to generate a request for information;
 a provider device configured to generate a provider response that is responsive to the request for information;

an on-demand directory service configured to store provider information and an access control policy, the access control policy including a predetermined condition of a business or government;

an on-demand visibility service configured to be a broker between the consumer device and provider device, receive requests for information from the consumer, request a list of appropriate providers from the on-demand directory service based on the provider information and the access control policy, transmit a provider query to a select provider, receive the provider response responsive to the provider query, and transmit an answer to the request for information to the consumer, wherein the access control policy comprises information on an availability of a provider device, so that the on-demand visibility service only transmits the provider queries to a particular provider when the access control policy indicates that the particular provider is available.

2. The on-demand communication system according to claim 1, wherein the provider device further comprises a sensor that is configured to gather data that is used to generate the provider response.

3. The on-demand communication system according to claim 2, wherein the sensor comprises at least one of a camera, a video camera, a key pad, a temperature sensor, a humidity sensor, a global positioning system sensor, an audio sensor, a vibration sensor, and an electrical sensor.

4. The on-demand communication system according to claim 2, wherein the sensor is integral with the provider device.

5. The on-demand communication system according to claim 2, wherein the sensor is separate and coupled to the provider device.

6. The on-demand communication system according to claim 1, further comprising a plurality of sensors configured to form a swarm and communicate with each other within the swarm.

7. The on-demand communication system according to claim 6, further comprising:
   a plurality of swarms that are configured to communicate with each other to generate the provider response to the provider query.

8. The on-demand communication system according to claim 1, wherein the control access policy includes information about the provider including at least one of a location of the provider, available sensors of the provider, prior agreement between provider and the on-demand directory, a time of day when the provider may be queried, a date when the provider may be queried, and a predetermined condition of a business or government.

9. The on-demand communication system according to claim 1, wherein the access control policy includes information about the consumer, including at least one of a status of the consumer, a number of points contained in a consumer account, a relationship between the consumer and the provider, a time of day when the request for information may be generated, and a date when the request for information may be generated.

10. An on-demand communication system, comprising:
   a consumer device configured to generate a request for information;
   a provider device configured to generate a provider response that is responsive to the request for information;
   an on-demand directory service configured to store provider information and an access control policy, the access control policy including a predetermined condition of a business or government;
   an on-demand visibility service configured to be a broker between the consumer device and provider device, receive requests for information from the consumer, request a list of appropriate providers from the on-demand directory service based on the provider information and the access control policy, transmits a provider query to a select provider, receive the provider response responsive to the provider query, and transmit an answer to the request for information to the consumer while utilizing the services stored in the on-demand visibility service; and
   a plurality of sensors configured to form a swarm and communicate with each other within the swarm.

11. The on-demand communication system according to claim 10, wherein the on-demand directory service is further configured to store applications enabled by the on-demand directory service or on-demand visibility service.

12. The on-demand communication system according to claim 10, wherein the on-demand directory service further comprises a portal, the portal configured to enable outside applications to be executed by the on-demand directory.

13. The on-demand communication system according to claim 10, wherein the services comprise at least one of business services, information services and enterprise service bus services.

14. The on-demand communication system according to claim 10, wherein the provider device further comprises a sensor that is configured to gather data that is used to generate the provider response.

15. The on-demand communication system according to claim 11, wherein the sensor comprises at least one of a camera, a video camera, a key pad, a temperature sensor, a humidity sensor, a global positioning system sensor, an audio sensor, a vibration sensor, and an electrical sensor.

16. The on-demand communication according to claim 11, wherein the sensor is integral with the provider device.

17. The on-demand communication system according to claim 11, wherein the sensor is separate and coupled to the provider device.

18. The on-demand communication system according to claim 15, further comprising:
   a plurality of swarms that are configured to communicate with each other to generate the provider response to the provider query.

19. The on-demand communication system according to claim 10, wherein the access control policy comprises information on an availability of a provider device, so that the on-demand visibility service only transmits the provider queries to a particular provider when the access control policy indicates that the particular provider is available.

20. The on-demand communication system according to claim 17, wherein the control access policy includes information about the provider including at least one of a location of the provider, available sensors of the provider, prior agreement between provider and the on-demand visibility services, a time of day when the provider is queried, a date when the provider is queried, and a predetermined condition of a business or government.

21. The on-demand communication system according to claim 17, wherein the control access policy includes information about the consumer, including at least one of a status of the consumer, a number of points contained in a consumer account, a relationship between the consumer and the provider, a time of day when the request for information is generated, and a date when the request for information is generated.

22. An on-demand communication method, comprising:
generating a request for information by a consumer device;
receiving a request for information from the consumer device by an on demand visibility service, the on-demand visibility service acting as a broker between the consumer device and provider device;
requesting a list of appropriate providers from an on-demand directory service based on provider information and access control policy stored in the on-demand directory service, the access control policy comprising information on an availability of a provider device and a predetermined condition of a business or government:
transmitting a provider query to the provider device by the on-demand visibility service only when the access control policy indicates the availability of the provider device;
generating a provider response that is responsive to the request for information by a provider device to the on-demand visibility service; and
transmitting an answer to the request for information to the consumer device by the on-demand visibility service.

23. The on-demand communication method according to claim 22, wherein the control access policy includes information about the provider including at least one of a location of the provider, available sensors of the provider, prior agreement between provider and the on-demand visibility service, a time of day when the provider is queried, a date when the provider is queried, and a predetermined condition of a business or government.

24. The on-demand communication method according to claim 22, wherein the control access policy includes information about the consumer, including at least one of a status of the consumer, a number of points contained in a consumer account, a relationship between the consumer and the provider, a time of day when the request for information is generated, and a date when the request for information is generated.

* * * * *